(12) United States Patent
Ramakesavan

(10) Patent No.: US 7,305,695 B1
(45) Date of Patent: Dec. 4, 2007

(54) SYSTEM FOR PROVIDING VIDEO ON DEMAND WITH PAUSE FEATURE

(75) Inventor: Sundaram Ramakesavan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 09/234,559

(22) Filed: Jan. 20, 1999

(51) Int. Cl.
*H04N 7/173* (2006.01)

(52) U.S. Cl. .......................................... 725/88; 725/89

(58) Field of Classification Search ............ 348/7, 348/10, 5.5; 455/4.2; 709/214; 725/87–89
See application file for complete search history.

(56) References Cited

U.S. PATENT DOCUMENTS

| | | | |
|---|---|---|---|
| 5,453,779 A * | 9/1995 | Dan et al. ...................... | 725/88 |
| 5,537,473 A * | 7/1996 | Saward ........................ | 380/230 |
| 5,555,441 A | 9/1996 | Haddad | |
| 5,559,549 A | 9/1996 | Hendricks et al. | |
| 5,594,492 A * | 1/1997 | O'Callaghan et al. ........ | 348/10 |
| 5,654,747 A * | 8/1997 | Ottesen et al. ............... | 348/10 |
| 5,768,681 A * | 6/1998 | Dan et al. ..................... | 725/95 |
| 5,802,275 A | 9/1998 | Blonder | |
| 5,818,934 A | 10/1998 | Cuccia | |
| 5,963,202 A * | 10/1999 | Polish .......................... | 348/7 |
| 6,025,868 A * | 2/2000 | Russo ........................... | 348/3 |
| 6,069,647 A * | 5/2000 | Sullivan et al. .............. | 348/5.5 |

FOREIGN PATENT DOCUMENTS

| | | |
|---|---|---|
| EP | 0 450 841 A2 | 10/1991 |
| EP | 0 676 897 A2 | 10/1995 |
| EP | 0 838 930 | 2/2003 |
| JP | 4-223787 | 8/1992 |
| JP | 8-149449 | 6/1996 |
| JP | 8-297919 | 11/1996 |
| JP | 9-107526 | 4/1997 |
| JP | 10-13784 | 1/1998 |
| JP | 10-327396 | 12/1998 |
| JP | 11-4407 | 1/1999 |
| WO | WO 96/17475 | 6/1996 |

* cited by examiner

*Primary Examiner*—Victor R. Kostak
(74) *Attorney, Agent, or Firm*—Trop, Pruner & Hu, P.C.

(57) ABSTRACT

A system for providing video upon request may transmit encrypted video information to one or more recipients for viewing at a later time. The recipient may make a request to view one of the received video files. This request may be provided to a video transmitter which may provide, in return, video decryption information to allow immediate viewing of the previously received video transmission.

23 Claims, 3 Drawing Sheets

SYSTEM FOR PROVIDING VIDEO ON DEMAND WITH PAUSE FEATURE

BACKGROUND

This invention relates generally to providing video information to a plurality of users in a video distribution system.

Current video distribution systems include pay per view systems which are available from cable and satellite television providers. In these systems, a variety of different pay per view movies are offered for viewing at a plurality of different times. The user must either join the video in progress or wait until a preset time when a new video begins. By offering a plurality of different starting times, these systems attempt to provide an approximation of video on demand.

In order to provide the video to a plurality of users at the exact times when they would like to have it, one might expect that a large bandwidth would be necessary. That is, given a large number of viewers, it would seem to be difficult to transmit different videos at a plurality of times given the bandwidth available with existing satellite and cable video distribution systems.

This means that the system users must accommodate their viewing desires to the existing bandwidth limitations of the video distribution system. Where those viewing desires do not correspond with the capabilities of existing systems, potential customers are lost.

Thus, it would desirable to provide a video distribution system which permits video distribution upon demand from the user.

SUMMARY

In accordance with one embodiment, a receiver for receiving video information from a video transmitter includes a storage medium for storing video information received by the receiver. A decryption engine is adapted to decrypt the stored video information. A controller is adapted to control the video storage medium and the decryption engine and to request decryption information for the engine.

DETAILED DESCRIPTION

Figure 1:
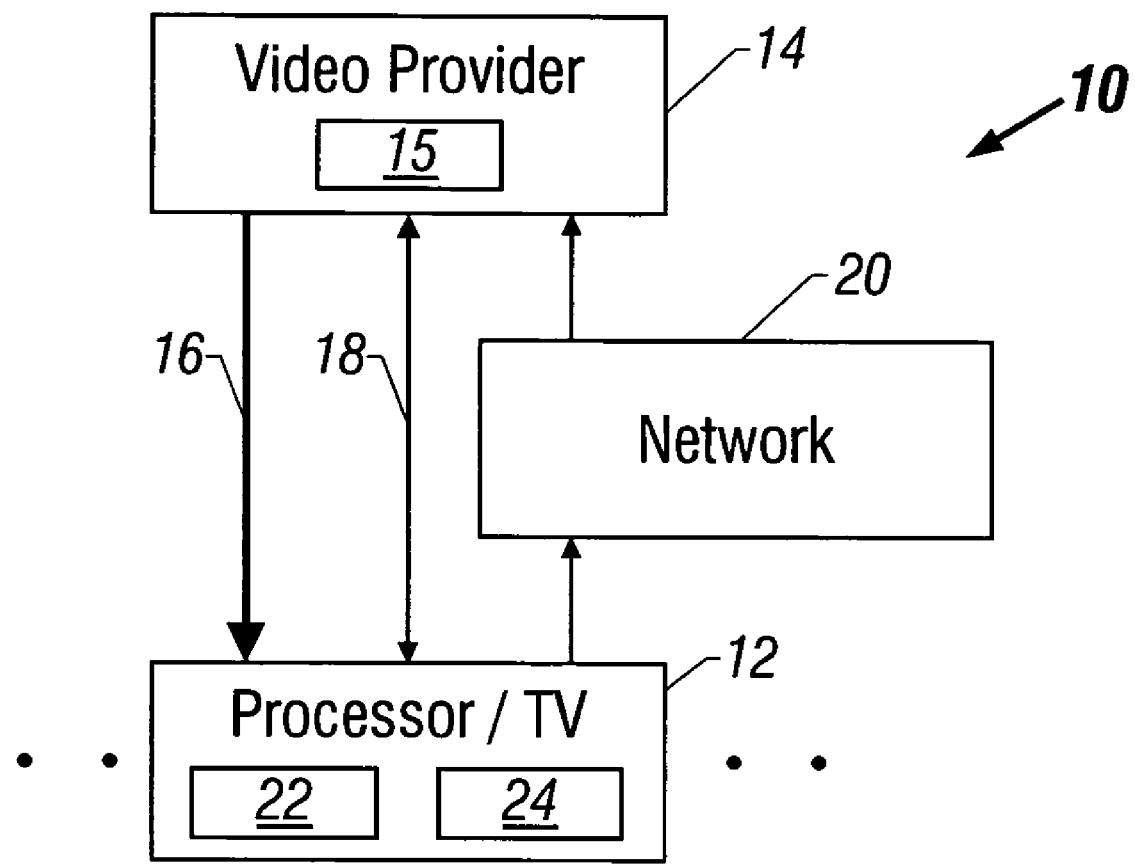
FIG. 1 is a schematic depiction of a video distribution network in accordance with one embodiment of the present invention.

Referring to FIG. 1, a video distribution system 10 may be implemented in a variety of different video distribution environments including cable, television broadcast, or satellite as examples. The video provider 14, which may be a cable provider or a satellite system provider as examples, transmits video, as indicated at 16, to a plurality of receivers 12 which may be processor based television receivers. The processor based television receivers may, for example, be so called set-top computer systems which use a television receiver as a display. Alternatively other computer systems and appliances may be used as well.

Instead of transmitting the video at a set or predetermined time corresponding to the time the video will be viewed, the video may be continually or semi-continuously streamed to all of the receivers in an encrypted form. Alternatively the video may simply be transmitted in advance and stored on a plurality of receivers. The individual receivers 12 may not be capable (without additional information) of displaying the transmitted video information. Thus, to the extent possible given the bandwidth of the system, video may be transmitted to the receiver 12 and stored thereon, for example in a memory 22, for viewing at a later time.

When a user desires to view particular video information, such as a movie, at any time, the user may simply request the decryption information, for example, from the video provider 14. In a two-way transmission scheme the request for decryption information may be transmitted over the same transport that conveyed the video. Alternatively, a separate medium or channel may be used. In addition, the decryption information may be requested from a source different from the video provider 14, in one embodiment of the invention.

The decryption information may then be transmitted with unrelated video information 16, in one example, to the receiver 12. For example, under control by the controller 15, the decryption information may be provided together with information about the intended recipient. Equipped with the decryption key for a particular video such as a movie, the receiver 12 can decrypt the video and allow the viewer to view the video on demand.

Where each of the receivers 12 includes a unique identifier and the decryption information is coded for the requesting receiver, only the receiver whose identifier matches an identifier transmitted with the decryption key is able to decode the decryption key for the requested video. In addition, when the receiver requests the decryption information, the receiver may not only be provided the decryption information, but appropriate billing provisions may be implemented as well.

Requests for the decryption information may be provided through a telephone network 20 as one example. As another example, the request may be made over an electronic network, such as the Internet using electronic mail. Thus, in effect a back channel may be used to request the decryption information from the video provider or other source in one embodiment. The video provider (or other source) then may provide not only the decryption information, but in one embodiment of the invention, the information needed to access the receiver's memory for the selected video information may also be provided. This access information may be provided as script or other software.

A predetermined amount of storage may be devoted to storing the video transmissions. When the video transmissions transmitted to a given receiver exceed the amount of dedicated storage, the oldest information may be deleted in order to make room to store the most recently received information. Alternatively, the video provider 14 may provide a signal each time it sends a new video to discard a particular video previously stored on a given receiver 12.

Since the video may be transmitted to the receiver 12, ahead of the viewing time, in one example, bandwidth limitations may be overcome. That is, the need to transmit a plurality of large video files at the same time to satisfy the demands of a large number of users is not necessary. Instead a set of video transmissions are streamed to all or part of a group of receivers which store those transmissions for later recall.

Figure 2:
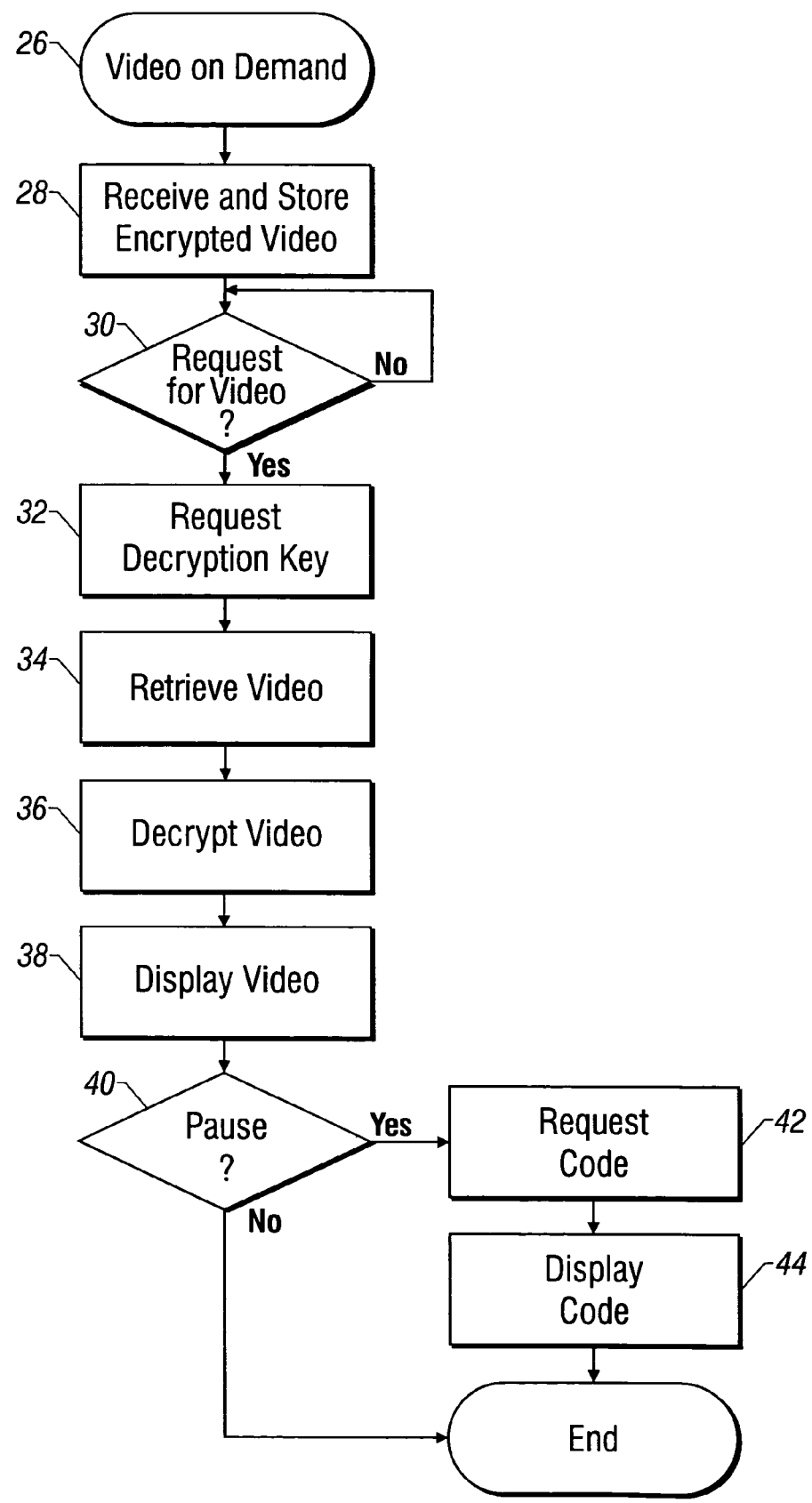
FIG. 2 shows a flow chart for implementing a receiver in accordance with the system shown in FIG. 1.

Referring now to FIG. 2, software, in accordance with one embodiment, may be stored on the receiver 12 for implementing a video on demand system. The software 26 may begin by receiving and storing the encrypted video as indicated in block 28. In one embodiment, this may be done at particular times when volume in the transmission channel is low or the transmission may be done continuously or semi-continuously so as to store a library of video files on the receiver 12.

Upon request for video, as indicated in diamond 30, the receiver 12 requests a decryption key as indicated in block 32. This request may be carried over a back channel, in one embodiment of the invention, through a network 20 such as the Internet or a telephone network. Next, the video, stored in an encrypted form on the receiver 12, is retrieved as indicated in block 34. The video may then be automatically decrypted as indicated in block 36, and the display of the video may begin as indicated in block 38.

Generally, it may be desirable to transmit a decryption key for sections or portions of a given video. Thus, to view the entire video, the receiver must receive one or more video decryption keys, each of which may be used to decrypt a portion (less than all) of the video information. The advantage of this technique is that a pirate must obtain a number of video decryption keys in order to decrypt the entire video. This makes it harder to pirate the decryption keys, decreasing the likelihood of theft of services. For example, a new decryption key may be needed for each minute of video. Therefore, it may be desirable to transmit a new decryption key every minute, once an initial request for decryption information has been made.

If the user wishes to pause the ongoing video transmission (diamond 40), a signal may be sent, for example, over a back channel to the video provider 14 requesting a pause authorization (block 42). The video provider may respond by providing an acknowledgement number (block 44). When the user wishes to resume the video transmission, the user may simply press a "resume" key and provide the acknowledgement number. The video provider then knows when the particular receiver paused and provides the appropriate keys to allow the user to continue to view the rest of the video that was already requested, and presumably, billed.

Figure 3:
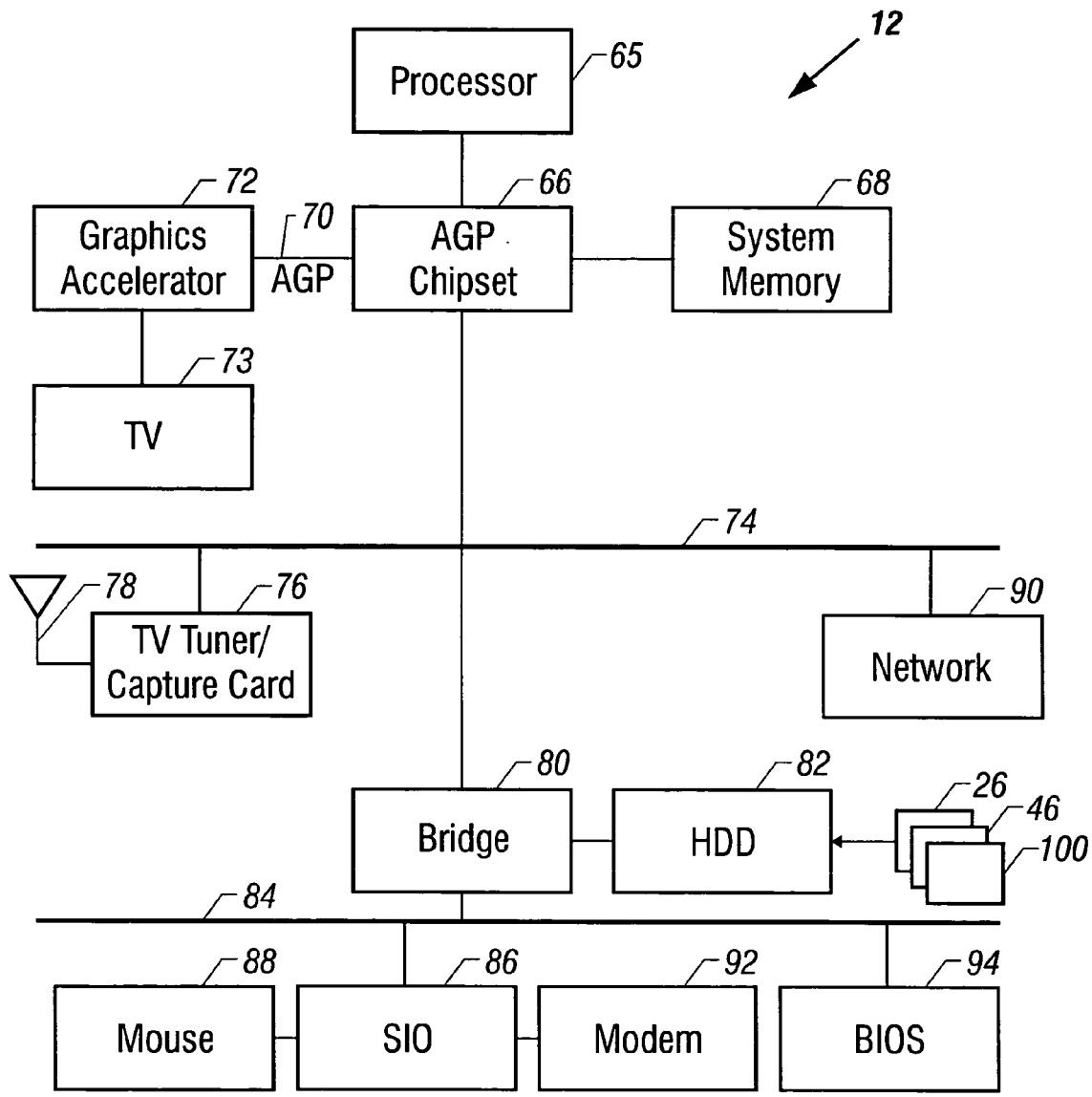
FIG. 3 is a block diagram showing one system for implementing the receiver shown in FIG. 1.

Turning now to FIG. 3, an example of a system that may be used as a receiver 12 is illustrated. The receiver 12 may include a processor 65 coupled to an accelerated graphics port (AGP) chipset 66. The Accelerated Graphics Port Specification, Rev 2.0, is available from Intel Corporation of Santa Clara, Calif. The chipset 66 may be coupled to system memory 68 and the accelerated graphics port bus 70. The bus 70 in turn may be coupled to a graphics accelerator 72, also coupled to a video or television receiver 73.

The chipset 66 may also be coupled to a bus 74 that receives a TV tuner/capture card 76. The card 76 may be coupled to a television antenna 78 which may also be a satellite antenna or a cable connection as additional examples. A connection to a network 90, such as a modem connection to the Internet or a network controller connection to a computer network may also be provided.

The bus 74 is coupled to a bridge 80 which in turn is coupled to a hard disk drive 82. The hard disk drive 82 may store the software 26 and 46. The software 100 may be script transmitted from the transmitter 14 to assist in locating stored video information.

The bridge 80 may in turn be coupled to another bus 84 which supports a serial output interface 86 and a BIOS 94. The interface 86 may be coupled to a modem 92 or a mouse 88.

While the present invention has been described with respect to a limited number of embodiments, those skilled in the art will appreciate numerous modifications and variations therefrom. It is intended that the appended claims cover all such modifications and variations which fall within the true spirit and scope of the present invention.

What is claimed is:

1. A receiver for receiving video information from a video transmitter comprising:
   a storage medium for storing video information received by a receiver;
   a decryption engine to decrypt stored video information; and
   a controller to control the storage medium and the decryption engine and request decryption information for the engine, said controller to control the play of video, to receive a request to pause the play of said video and to automatically request a code to enable video play to be resumed at a later time.

2. The receiver of claim 1 wherein said controller includes a processor.

3. The receiver of claim 1 wherein said engine is adopted to decrypt stored video upon receipt of a request to view stored video.

4. A video transmission system comprising:
   a video transmitter that transmits video to a plurality of receivers for display at a later time; and
   a controller that transmits decryption information to said receivers to enable video upon request, said controller receives a request for a code to enable the play of video to be paused and to be resumed at a later time, and in response said controller automatically provides said code.

5. The system of claim 4 wherein said controller also is adapted to transmit an identifier which identifies a particular receiver to receive said decryption information.

6. The system of claim 5 wherein said controller is part of said transmitter.

7. The system of claim 4 wherein said video transmitter transmits video over a cable system.

8. The system of claim 4 wherein said video transmitter transmits video over a satellite system.

9. The system of claim 4 wherein said transmitter also transmits information to assist in locating particular video files transmitted by said transmitter to said receivers.

10. A method comprising:
    storing encrypted video in a receiver;
    requesting a decryption key for said stored video;
    playing said video;
    receiving a request to pause said play of video;
    automatically requesting a code to enable said video to be played at a later time; and
    receiving an acknowledgement code and using said acknowledgement code to resume the play of video.

11. The method of claim 10 including receiving the encrypted video from one source and receiving the decryption key from a second source.

12. The method of claim 10 including receiving the video and said decryption key from the same source.

13. The method of claim 10 including receiving an identifier to identify a particular receiver to receive said key.

14. The method of claim 10 wherein using said acknowledgement number includes using said acknowledgement number to resume the play of video without an additional charge.

15. A video distribution method comprising:
    storing video for selection by the recipient;
    upon request by the recipient, allowing the recipient to select for viewing a stored video;
    playing said video;

in response to a request to pause the play of said video, automatically requesting a code to enable play to be resumed at a later time; and enabling the user to press a button to resume the play of said video and in response to the operation of said button, automatically transmitting a code to enable resumed play of said video.

16. The method of claim 15 including providing a graphical user interface which displays the video information which is available for selection by the user.

17. The method of claim 15 further including receiving a key to enable decryption of the video.

18. The method of claim 17 including resuming the play of video from the point where the video play was paused.

19. An article comprising a medium for storing instructions that cause a processor based system to:

store video for selection by the recipient;

upon request by a recipient, allow the recipient to select, for viewing, video previously stored;

play said video; and in response to a request to pause the play of said video, automatically request a code to enable play to be resumed at a later time.

20. An article comprising a medium for storing instructions that cause a processor based system to:

store encrypted video to a receiver;

request a decryption key, for said stored video;

play said video;

receive a request to pause said play of video; and automatically request a code to enable said video to be played at a later time.

21. The article of claim 20 including instructions that cause a processor based system to receive the encrypted video from one source and receive the decryption key from a second source.

22. The article of claim 20 including instructions that cause a processor based system to receive the video and said decryption key from the same source.

23. The article of claim 20 including instructions that cause a processor based system to receive an identifier to identify a particular receiver to receive said key.

\* \* \* \* \*